(12) United States Patent
Abali et al.

(10) Patent No.: US 8,874,893 B2
(45) Date of Patent: Oct. 28, 2014

(54) EFFECT TRANSLATION AND ASSESSMENT AMONG MICROARCHITECTURE COMPONENTS

(75) Inventors: Bulent Abali, Tenafly, NJ (US); Michael S. Floyd, Cedar Park, TX (US); Eren Kursun, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 13/429,587

(22) Filed: Mar. 26, 2012

(65) Prior Publication Data

US 2013/0254526 A1 Sep. 26, 2013

(51) Int. Cl.
| | | |
|---|---|---|
| G06F 9/00 | (2006.01) | |
| G06F 1/00 | (2006.01) | |
| G06F 1/32 | (2006.01) | |
| G06F 15/00 | (2006.01) | |
| G06F 3/00 | (2006.01) | |

(52) U.S. Cl.
USPC ............... 713/100; 713/1; 713/300; 713/320; 712/28; 712/32; 719/313

(58) Field of Classification Search
USPC .................. 713/1, 100, 300, 320; 712/28, 32; 719/313
See application file for complete search history.

(56) References Cited

U.S. PATENT DOCUMENTS

| 7,552,304 B2 | 6/2009 | Marchal et al. | |
|---|---|---|---|
| 2006/0026447 A1 | 2/2006 | Naveh et al. | |
| 2006/0253204 A1 | 11/2006 | Papanikolaou et al. | |
| 2008/0189569 A1* | 8/2008 | Chu | 713/600 |
| 2008/0301474 A1 | 12/2008 | Bussa et al. | |
| 2008/0301691 A1 | 12/2008 | Mamagkakis et al. | |
| 2009/0089543 A1* | 4/2009 | Gunther et al. | 712/30 |
| 2009/0235241 A1 | 9/2009 | Luk et al. | |
| 2011/0055603 A1* | 3/2011 | Wolfe | 713/320 |

OTHER PUBLICATIONS

Floyd, Michael et al., "Introducing the Adaptive Energy Management Features of the Power7 Chip", IEEE Computer Society, Mar./Apr. 2011, pp. 2-16.
Fruehe, John , "Multicore Processor Technology", Reprinted from Dell Power Solutions www.dell.com/powersolutions (Obtained from the Internet on Mar. 23, 2012), May 2005, pp. 67-72.
Heiser, Gernot , "Energy Management in Multicore Designs with Embedded Virtualization", Technology in Systems: Managing Power in Small Systems, rtcmagazine.com/articles/view/101521 (Obtained from the Internet on Feb. 23, 2012), Feb. 2010, 6 pages.
Li, Yingmin et al., "Impact of Thermal Constraints on Multi-Core Architectures", Thermal and Thermomechanical Phenomena in Electronics Systems, 2006. ITHERM '06. The Tenth Intersociety Conference on May 30-Jun. 2, 2006, 8 pages.

* cited by examiner

*Primary Examiner* — Stefan Stoynov
(74) *Attorney, Agent, or Firm* — DeLizio, Gilliam, PLLC

(57) ABSTRACT

Awareness of the relationships among the operating parameters for an individual core and among cores allows dynamic and intelligent management of the multi-core system. The relationships among operating parameters and cores, which can be somewhat opaque, are established with design-time simulations, and adapted with run time data collected from operation of the multi-core system. The relationships are expressed with functions that translate between operating parameters, between different cores, and between operating parameters of different cores. These functions are embodied in circuitry built into the multi-core system. The circuitry will be referred to hereinafter as a translator unit. The translator unit traverses the complex relational dependencies among multiple operating parameters and multiple cores, and determines an outcome with respect to one or more constraints corresponding to those operating parameters and cores.

20 Claims, 5 Drawing Sheets

EFFECT TRANSLATION AND ASSESSMENT AMONG MICROARCHITECTURE COMPONENTS

BACKGROUND

Embodiments of the inventive subject matter generally relate to the field of computer architecture, and, more particularly, to multi-core system architecture.

Increasing performance and management demands combined with confined design space has led to increased design complexity of a multi-core processor. Increased complexity in managing performance and energy/power consumption accompanies the increased design complexity. Management of performance and energy consumption employs tracking and managing operation of the multi-core processor.

SUMMARY

Embodiments of the inventive subject matter include a method of operating a system. The method comprises receiving an indication of a first value that quantifies a change in a first operating parameter corresponding to a first component of the system. The change in the first operating parameter has either been detected in the system or has been requested. The first value is translated into a second value that quantifies a change in a second operating parameter. The change in the second operating parameter results from the change in the first operating parameter. It is determined whether the second value violates a constraint on the second operating parameter. An outcome is generated based, at least in part, on said determining whether the second value violates the constraint on the second operating parameter. The outcome is supplied to influence initiation of an action that either reconciles the change in the first operating parameter that has been detected or effects the change in the first operating parameter at the first component.

A multi-core system comprises a plurality of components of the multi-core system, instrumentation adapted to monitor the multi-core system, and a translator unit encoded with a plurality of translation functions and a plurality of constraints. The translator unit is adapted to receive an indication of a first value that quantifies a change in a first operating parameter corresponding to a first component of the multi-core system associated with the change in the first operating parameter. The change in the first operating parameter has either been detected in the multi-core system or has been requested. The first value is translated into a second value that quantifies a change in a second operating parameter. The change in the second operating parameter results from the change in the first operating parameter. It is determined whether the second value violates a constraint on the second operating parameter. The translator unit is adapted to generate an outcome based, at least in part, on a determination of whether the second value violates the constraint on the second operating parameter. The translator unit is adapted to supply the outcome to influence initiation of an action that either reconciles the change in the first operating parameter that has been detected or effects the change in the first operating parameter at the first component.

BRIEF DESCRIPTION OF THE DRAWINGS

The present embodiments may be better understood, and numerous objects, features, and advantages made apparent to those skilled in the art by referencing the accompanying drawings.

FIG. 2 depicts example operations for processing an indication of a change in a multi-core system. FIG. 3 depicts example operations that continue from FIG. 2.

DESCRIPTION OF EMBODIMENT(S)

Figure 1:
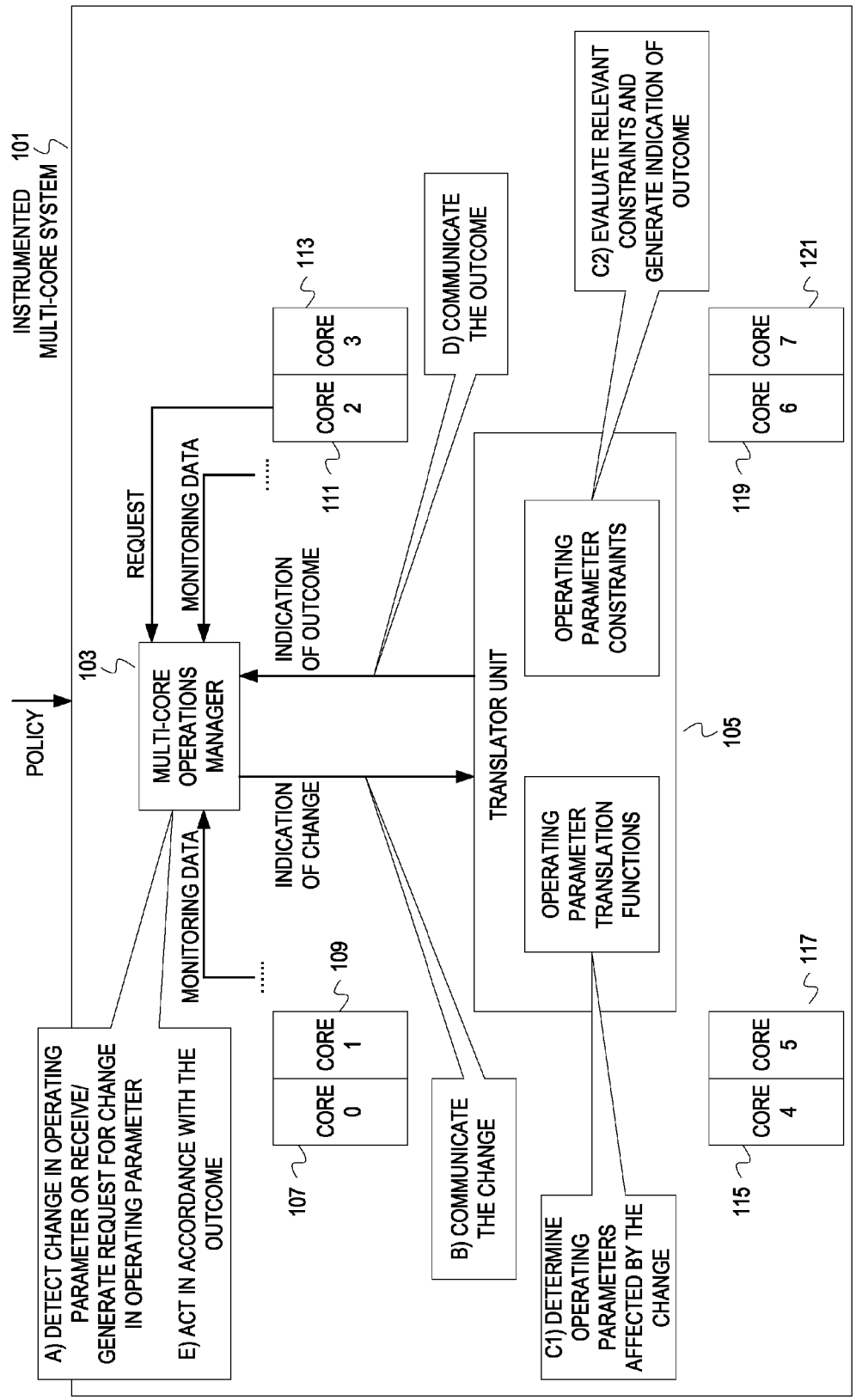
FIG. 1 depicts an example conceptual diagram of a multi-core system that comprises a translator unit.

The description that follows includes exemplary systems, methods, techniques, instruction sequences and computer program products that embody techniques of the present inventive subject matter. However, it is understood that the described embodiments may be practiced without these specific details. For instance, although examples refer to 2-dimensional multi-core architecture, the inventive subject matter can also be employed in 3-dimensional multi-core architectures. Although the description refers to operating parameters of cores, the operating parameters may correspond to other components of a system (e.g., interconnects, memory components, bus components, components within cores, etc.). In other instances, well-known instruction instances, protocols, structures and techniques have not been shown in detail in order not to obfuscate the description.

Operation of a core in a multi-core processor involves numerous operating parameters. An operating parameter may be directly controlled (e.g., voltage) or indirectly controlled (e.g., temperature). A few examples of operating parameters include power, voltage, frequency, workload, temperature, current, multi-threading level, and reliability. A multi-core system imposes constraints on at least some operating parameters (e.g., peak operating temperature, maximum power consumption, minimum reliability, etc.). A change to an operating parameter at one core can have varying effects throughout the multi-core system depending upon locality, relationships between operating parameters, and/or multi-core system resolution (e.g., chip-level, core-level, etc.). The effects include effects on other operating parameters and effects on constraint evaluations. For example, a change in power consumption by one core can affect temperatures of other cores to varying degrees depending upon proximity of the other cores. And the effects on temperatures may comply with a chip-level temperature constraint while violating a core level temperature constraint. Further, both the change to power and resulting change in temperature can affect reliability (also referred to herein as wear-out or stress) of cores depending upon locality.

Awareness of the relationships among the operating parameters for an individual core and among cores allows dynamic and intelligent management of the multi-core system. The relationships among operating parameters and cores, which can be somewhat opaque, are established with design-time simulations, and adapted with run time data collected from operation of the multi-core system. For example, design time simulations can reveal relationships between power and reliability based on core locality with respect to the components implementing a change in power. Those relationships can later adapt to runtime observations. Moreover, new relationships can be discovered from analyzing operating data collected for a multi-core system. For example, analysis can reveal a relationship between a particular firmware and one or more other operating parameters. Embodiments can also allow the translation functions and/or relationship data to be loaded, programmed, configured, or reconfigured, after deployment of the multi-core system in accordance with different environments. For instance, relationships and/or operating parameters can vary with different physical environments (e.g., data bunkers in cold climates), different operating environments (e.g., different operating systems, different circuit boards, different network topologies), etc. The relationships are expressed with functions that translate between operating parameters, between different cores, and between operating parameters of different cores. These functions are embodied in circuitry built into the multi-core system. For example, circuitry that implements a finite state machine. The circuitry will be referred to hereinafter as a translator unit. The translator unit traverses the complex relational dependencies among multiple operating parameters and multiple cores, and determines an outcome with respect to one or more constraints corresponding to those operating parameters and cores.

FIG. 1 depicts an example conceptual diagram of a multi-core system that comprises a translator unit. An instrumented multi-core system 101 comprises a multi-core operations manager 103, 8 cores (core 0 107, core 1 109, core 2, 111, core 3 113, core 4 115, core 5 117, core 6 119, and core 7 121), and a translator unit 105. The instrumented multi-core system 101 also comprises un-depicted instrumentation that monitors operating parameters and/or events of the multi-core system 101 (e.g., digital thermal sensors, critical path monitors, counters, etc.). Other components of the multi-core system 101 are not depicted (e.g., interconnects, memory, etc.) in order to avoid obfuscating the description. FIG. 1 depicts the multi-core operations manager 103 adapted to receive monitoring data from instrumentation and to receive requests from the cores. In addition, the multi-core operations manager 103 is adapted to send and receive signals/data to or from the translator unit 105.

The multi-core operations manager 103 can be embodied in an on-chip microcontroller, a core, an off-chip microcontroller, etc. The multi-core operations manager 103 may be responsible for resource management and/or policy implementation. Examples of resource management include energy management and performance management. A policy can express preferences, such as energy efficiency over performance. As another example, a policy can express an aggressive preference for performance over hardware longevity or reliability. Thus, the multi-core operations manager 103 may manage operation of the multi-core system 101 to achieve the expressed policy. Operating parameter constraints can override policies, but not necessarily. The multi-core operations manager 103 manages operations of the multi-core system 101 based on monitoring data from the instrumentation, based on policies, and based on requests from the cores (e.g., requests for more power, frequency and voltage scaling requests, etc.). In FIG. 1, stages A-E illustrate example operations involving the multi-core operations manager 103 and the translator unit 105.

At stage A, the multi-core operations manager 103 detects a change in an operating parameter (e.g., rise in temperature) based on the monitoring data, or receives a request for a change in an operating parameter from one of the cores. The multi-core operations manager 103 can also generate a request for a change in an operating parameter, for instance to implement a policy or change workload distribution across cores.

At stage B, the multi-core operations manager 103 communicates the change to the translator unit 105. The multi-core operations manager 103 indicates the operating parameter corresponding to the change and a corresponding core. The operating parameter that has changed or is being requested to change can be considered a cause of other changes in the same operating parameter at other cores and the cause of changes in other operating parameters across cores. Hence, this operating parameter is sometimes referred to herein as the causal operating parameter. Similarly, the core that is subject to the change (i.e., the core at which the change is detected or requested) is sometimes referred to herein as the causal core. Accordingly, that naming convention is carried through to the other cores and other operating parameters that are affected indirectly and directly by the change. Those cores and operating parameters are referred to herein as affected cores and affected operating parameters. The naming convention is based on a perspective from the causal operating parameter and the causal core even though cause and effect can be nested.

Stages C1 and C2 depict operations performed by the translator unit 105. The operations of these stages C1 and C2 alternate and iterate. In stage C1, the translator unit 105 determines operating parameters affected by the change of the causal operating parameter. The translator unit 105 uses encoded operating parameter translation functions. With the translation functions, the translator unit 105 translates the change in the causal operating parameter at the causal core into changes in the causal operating parameter of other cores, and changes to other operating parameters across the cores—including the causal core. The other cores affected can vary. Assuming core 1 109 is the causal core, the change in core 1 109 may only translate into changes in one or more operating parameters at core 0 107 due to proximity. The change can impact cores at a further distance, or the change may be independent of proximity. In stage C2, the translator unit 105 evaluates relevant constraints and generates an indication of an outcome of the evaluated constraints. In FIG. 1, operating parameter constraints are embodied in the translator unit 105. For each operating parameter affected by the change, the translator unit 105 evaluates a corresponding constraint(s).

As an example illustration with core 1 109 as the casual core and an operating parameter A as the causal operating parameter, the translator unit 105 determines that a valueA1 for parameter A complies with a constraint for core 1 109. The translator unit 109 then successively translates the valueA1 for parameter A for each of the other cores {valueA0, valueA2, valueA3, valueA4, valueA5, valueA6, and valueA7}. As stated elsewhere, the translator unit does not necessarily translate a causal operating parameter for every core. After each translation, the translator unit 109 evaluates the translated value against a corresponding constraint of the relevant core. Assuming each of these constraints for operating parameter A across the cores is satisfied, the translator unit 109 translates valueA1 of parameter A into valueB1 of an operating parameter B for core 1 109. If valueB1 satisfies the parameter B constraint for core 1 109, then the translator unit 109 successively translates the valueB1 for each of the other cores and evaluates the corresponding constraints until a constraint is violated. Assuming no constraint is violated, the translator unit 105 proceeds to the next operating parameter that is affected by operating parameter A.

The translator unit 105 evaluates operating parameter constraints at each resolution of the multi-core system 101. For instance, the translator unit 105 may evaluate an operating parameter constraint for each of a plurality of cores, each of multiple groupings of the plurality of cores (e.g., regional constraints), and a constraint for the operating parameter defined at the chip level. If the relevant constraints are satisfied, the translator unit 105 will generate an indication that the change does not violate a constraint. Otherwise, the translator unit 105 generates an indication that the change violates a constraint.

At a stage D, the translator unit 105 communicates the outcome to the multi-core operations manager 103. The translator unit 105 can supply a binary indication that essentially communicates a yes or no to the multi-core operations manager 103 (e.g., the request can be granted or corrective action should be taken). The translator unit 105 can communicate more detailed information, such as the constraint that was violated and the affected core for the violated constraint. The translator unit 105 can also communicate a magnitude of violation of a constraint. This allows the multi-core operations manager 103 to scale a request to satisfy the constraint instead of rejecting a request or instead of cycling through another interaction with the translator unit with a different request.

At a stage E, the multi-core operations manager 103 can act in accordance with the outcome communicated from the translator unit. For example, the multi-core operations manager 103 causes more power to be allotted to a core in accordance with a power request that did not violate any constraints. As another example, the multi-core operations manager 103 initiates cooling actions responsive to a communication from the translator unit 105 that a power change would cause temperature of a core to violate a constraint.

Figure 2:
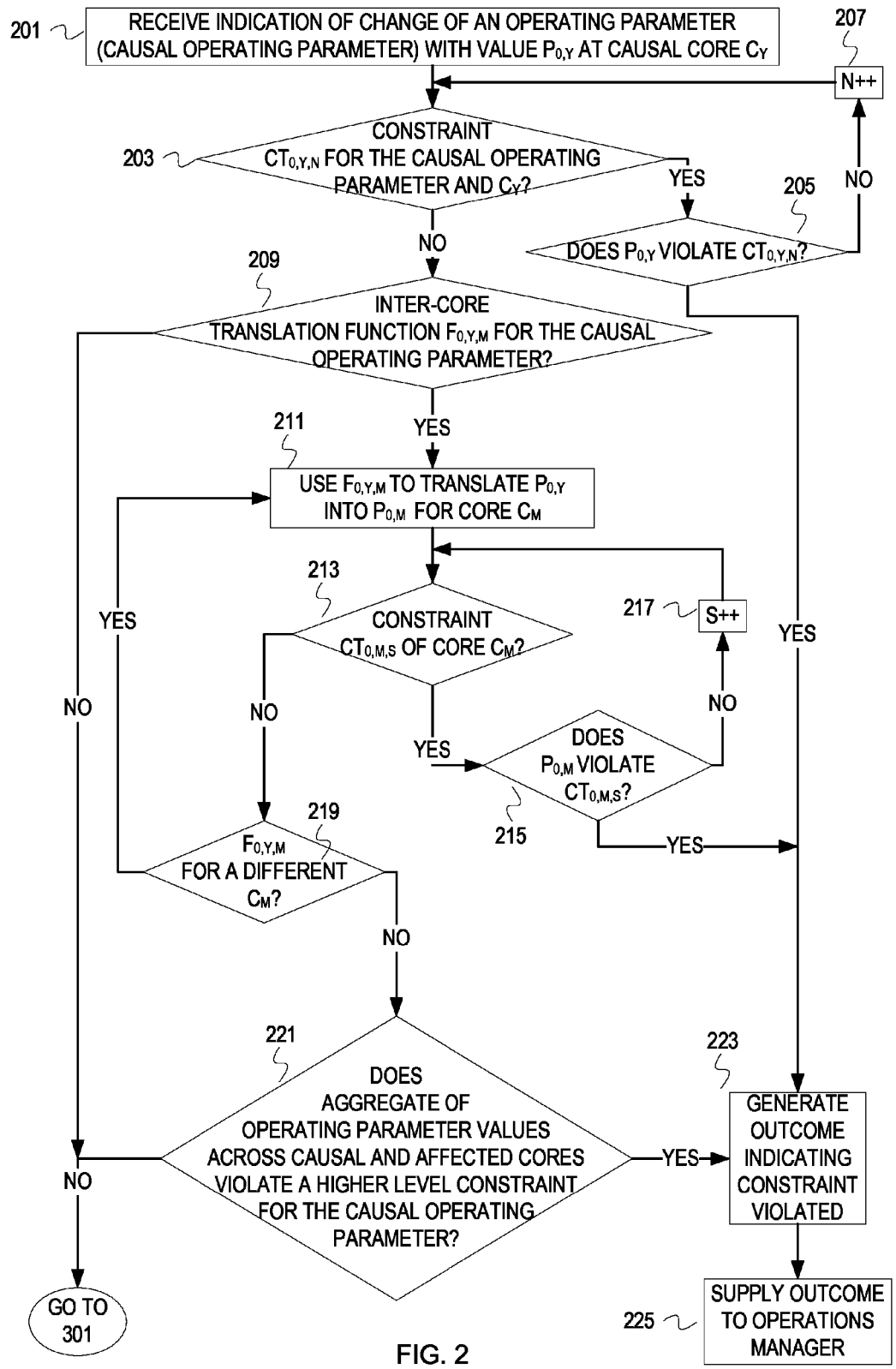
FIGS. 2 and 3 depict a flowchart of example operations of a translator unit.
Figure 3:
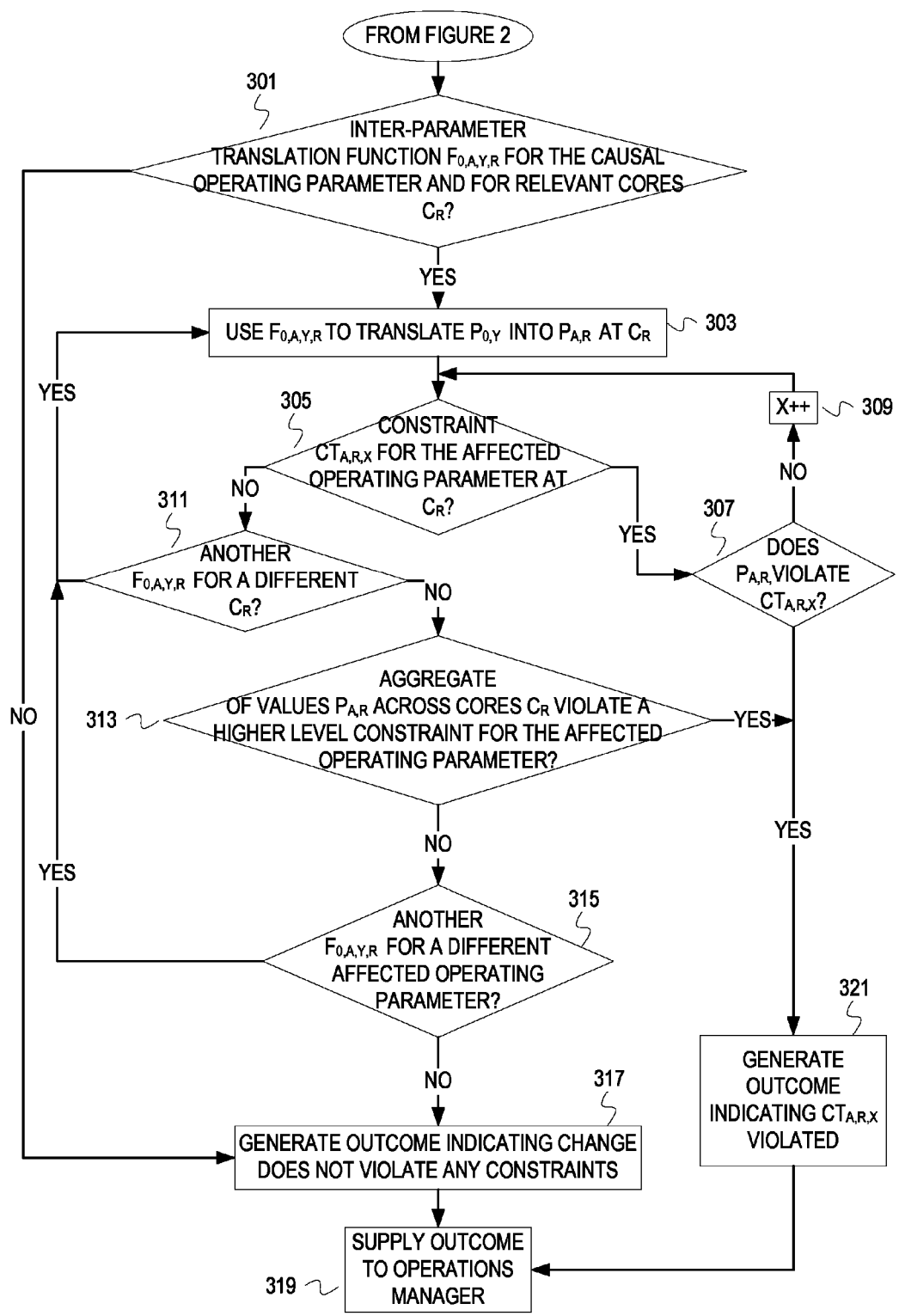

FIGS. 2 and 3 depict a flowchart of example operations of a translator unit. FIG. 2 depicts example operations for processing an indication of a change in a multi-core system. At block 201, a translator unit receives an indication of a change in an operating parameter (e.g., voltage, current, temperature, power, etc.) with a value $P_{O,Y}$ at a causal core $C_Y$. The value $P_{O,Y}$ represents a quantified change in the causal operating parameter. The value can be expressed as a delta or as a current value (e.g., change in temperature or current temperature). The value can explicitly indicate a metric appropriate for the operating parameter (e.g., Celsius or Fahrenheit for temperature, milliamps for current, etc.). Embodiments are not required to explicitly express the metric. For instance, $P_{O,Y}$ may be a floating point number without any indication of the temperature metric based on an assumption that the digital temperature sensors being used measure in Celsius.

At block 203, the translator unit determines whether there is a constraint $CT_{O,Y,N}$ for the causal operating parameter for the core $C_Y$. In one implementation, the translator unit indexes into a table of constraints based on a core identifier and an operating parameter identifier. Determining whether there is a constraint involves the translator unit walking through entries associated with the index, for example. Constraints can be encoded as a vector of constraints in an entry, encoded in multiple distinct entries, etc. Although a constraint may be shared across cores for a given operating parameter, these example operations assume a distinct set of constraints for each core regardless of possible redundancy. But embodiments are not so limited. Moreover, a multi-core system that includes special purpose or heterogeneous cores may impose different constraints based on the type of core. Furthermore, the constraint $CT_{O,Y,N}$ can be expressed as a function, a conditional statement implemented with logic gates, etc. Embodiments can also define prioritized and/or conditional constraints. For example, different constraints can be applied depending upon a policy applied to the multi-core system or depending upon an operating mode of the multi-core system. In addition, embodiments can define constraints that have a time facet. For example, a constraint can be violated within a threshold for a given amount of time. If there is a constraint $CT_{O,Y,N}$, then control flows to block 205. Otherwise, control flows to block 209.

At block 205, the translator unit determines whether $P_{O,Y}$ violates the constraint $CT_{O,Y,N}$ for the causal operating parameter P at the core $C_Y$. If the value $P_{O,Y}$ violates the constraint $CT_{O,Y,N}$, then control flows to block 223. If the value $P_{O,Y}$ does not violate the constraint, then control flows to block 207.

At block 207, the translator unit increments an index N that corresponds to the constraints for the causal operating parameter at the causal core. This incrementing operation of indices by the translator unit is depicted through the blocks of the flowcharts, and are may not be performed in embodiments. Embodiments of a translator unit may not increment an index value or perform an addition operation to advance to the next constraint. The translator unit may sequentially select each of a set of constraints in one or more entries until reaching a null value or an end of a table. Control flows from block 207 back to block 203.

At block 209, the translator unit determines whether there is an inter-core translation function $F_{O,Y,M}$ that translates the causal operating parameter value $P_{O,Y}$ at core $C_Y$ into a value at a relevant core $C_M$. Relevancy of cores can be pre-defined and static, pre-defined and adaptive, customized at deployment, etc. Relevancy can be based on various characteristics. Examples of characteristics that can influence relevancy of cores include physical proximity, core grouping, type of core in a heterogeneous multi-core system, etc. And that relevancy may vary with the operating parameter. Referring to FIG. 1 and assuming $C_Y$ is core 2 111, $C_M$ may only be core 3 113 for the operating parameter of temperature. For the operating parameter of power, $C_M$ may encompass all of the cores of the multi-core system 101. For an operating parameter of on-chip memory allocation, $C_M$ may encompass a group of cores assigned a particular workload. If there is a translation function $F_{O,Y,M}$, then control flows to block 211. If there is not, then control flows to block 301 of FIG. 3.

At block 211, the translator unit uses a function $F_{O,Y,M}$ to translate $P_{O,Y}$ at $C_Y$ into $P_{O,M}$ at $C_M$. Assuming $P_{O,Y}$ at a core 3 is a 5 degree increase in temperature, a function F034, which translates temperature changes at core 3 into temperature changes at core 4, translates the 5 degree increase at C3 into a 4 degree increase for the core C4. For a different core 1, a function F031, which translates temperature changes at core 3 to temperature changes at core 1, translates 5 degrees at C3 into a 2 degree increase at the core C1.

At block 213, the translator unit determines whether there is a constraint $CT_{O,M,S}$ of core $C_M$ for the causal operating parameter. If there is such a constraint, control flows to block 215. If there is no such constraint, then control flows to block 219.

At block 215, the translator unit determines whether $P_{O,M}$ violates the constraint $CT_{O,M,S}$ of the core $C_M$ for the causal operating parameter. If $P_{O,M}$ violates the constraint, then control flows to block 223. If the translated value $P_{O,M}$ does not violate the constraint, then control flows to block 217.

At block 217, the translator unit increments an index S that corresponds to the constraints of the core $C_M$ for the causal operating parameter. Control flows from block 217 back to block 213.

At block 219, the translator unit determines whether there is another translation function $F_{O,Y,M}$ that translates the causal operating parameter between the core $C_Y$ and another core $C_M$. If there is another translation function $F_{O,Y,M}$, then control flows back to block 211. Otherwise, control continues to block 221.

At block 221, the translator unit determines whether an aggregate of the operating parameter values (i.e., the value $P_{O,Y}$ and the translated values $P_{O,M}$) violates a higher-level constraint for the causal operating parameter. Determining whether the aggregate of the operating parameter values violates a constraint at a higher level of resolution than an individual core can take many forms. In one example, a translator unit determines whether a sum of the operating parameter values exceeds a constraint. In another example, a translator unit determines whether operating parameter values fall within an acceptable range based on a greatest and a least of the operating parameter values. Furthermore, embodiments can define and evaluate constraints at multiple resolutions. If the aggregate of the operating parameter values violates a constraint of a higher level resolution, then control flows to block 223. Otherwise, control flows to block 301 of FIG. 3.

When the translator unit determines a constraint is violated (blocks 205, 215, or 221), then control flowed to block 223. At block 223, the translator unit generates an outcome indicating that the constraint was violated. Embodiments can include different granularities of information in the outcome. The generated outcome can indicate that a constraint was violated, can identify which constraint was evaluated, can indicate a constraint was violated and a corresponding core, can identify the operating parameter of the change and a translated operating parameter that corresponds to a violated constraint, etc. In an example of a constraint with a time facet, the translator unit can generate an outcome that indicates the amount of time the change can be effected without violating the constraint and a threshold to which the operating parameter must adhere to avoid violating the constraint once the time amount of time expires.

At block 225, the translator unit supplies the generated outcome to the multi-core operations manager. In some embodiments, the translator unit interacts with multiple operations manager. For example, a translator unit interacts with both a performance manager and a power manager. In another example, each different operations manager interacts with a particular translator unit. For instance, a multi-core system is built with a first translator unit that encodes translation functions for the operating parameters relevant to a power manager and with a second translator unit that encodes translation functions for the operating parameters relevant to a performance manager. As another example, a three-dimensional multi-core system can be built with a translator unit at each layer of the y-axis.

FIG. 3 depicts example operations that continue from FIG. 2. At block 301, the translator unit determines whether there is an inter-parameter translation function $F_{O,A,Y,R}$ that translates the causal operating parameter value $P_{O,Y}$ into an affected operating parameter (represented by A) at a relevant core $C_R$. Relevancy of a core can be based on any of the characteristics described earlier with respect to block 209, but also includes the causal core $C_Y$. So, inter-parameter translation functions can involve a translation between operating parameters of the causal cores and between the causal operating parameter of the causal core and an affected parameter of an affected core. If there is at least translation function $F_{O,A,Y,R}$, then control flows to block 303. Otherwise, control flows to block 315.

At block 303, the translator unit uses a function $F_{O,A,Y,R}$ to translate $P_{O,Y}$ at $C_Y$ into $P_{A,R}$ of an affected operating parameter at $C_R$, which may be $C_Y$. To illustrate, a first translation function can translate a change in power consumption at the causal core into a change in temperature at a neighboring core. Another translation function can translate the change in power consumption at the causal core into a change in reliability at the affected core.

At block 305, the translator unit determines whether there is a constraint $C_{T,A,R,X}$ of core $C_R$ for the affected operating parameter. If there is such a constraint, control flows to block 307. If there is no such constraint, then control flows to block 311.

At block 307, the translator unit determines whether $P_{A,R}$ violates the constraint $C_{T,A,R,X}$ of the core $C_R$ for the affected operating parameter. If $P_{A,R}$ violates the constraint $C_{T,A,R,X}$, then control flows to block 321. If the translated value $P_{A,R}$ does not violate the constraint, then control flows to block 309.

At block 309, the translator unit increments an index X that corresponds to the constraints of the core $C_R$ for the affected operating parameter. Control flows from block 309 back to block 305.

At block 311, the translator unit determines whether there is another translation function $F_{O,A,Y,R}$ that translates the causal operating parameter into another affected operating parameter at the causal core or another affected core. If there is another translation function $F_{O,A,Y,R}$, then control flows back to block 303. Otherwise, control continues to block 313. For example, the translator unit initially translates the causal operating parameter into the affected operating parameter at the causal core and evaluates the corresponding constraints. Assuming no violation, the translator unit then moves onto translation functions that translate the causal operating parameter at the causal core into the affected operating parameters at the affected cores. Affected operating parameters at the causal core are not necessarily the same affected operating parameters at the affected cores. Also, the affected operating parameters can vary between the affected cores.

At block 313, the translator unit determines whether an aggregate of the affected operating parameter values (i.e., aggregate of the values $P_{A,R}$) violates a higher-level constraint for the affected operating parameter. If the aggregate of the affected operating parameter values violates a constraint of a higher level resolution, then control flows to block 321. Otherwise, control flows to block 315.

At block 315, the translator unit determines whether there is another $F_{O,A,Y,R}$ for a different affected operating parameter. If there is another $F_{O,A,Y,R}$ for a different affected operating parameter, then control flows back to block 303. If there is not another $F_{O,A,Y,R}$ for a different affected operating parameter, then control flows to block 317.

At block 317, the translator unit generates an outcome indicating that the change does not violate any constraints.

At block 319, the translator unit supplies the outcome to the multi-core operations manager.

When the translator unit determines a constraint is violated (blocks 307 or 313), then control flowed to block 321. At block 321, the translator unit generates an outcome indicating that the constraint $C_{T,A,R,X}$ was violated. As described earlier, embodiments can include different granularities of information in the outcome.

The flowcharts are provided to aid in understanding the inventive subject matter, and should not be used to limit embodiments of the inventive subject matter and/or scope of the claims. Embodiments can perform additional operations, fewer operations, different operations, operations in parallel, etc. For instance, the example operations of the depicted flowcharts assume a single higher-level resolution in a multi-core system. In some embodiments, changes and constraints correspond to a lower resolution than the core. For example, a multi-core system may monitor or derive changes in execution units of a core (e.g., fixed point unit, branch unit, and floating point unit), and evaluate constraints defined for the execution units. The example operations of the depicted flowcharts also assumed that the translator unit breaks out upon detecting a constraint violation, and reports the violation. In some embodiments, the violation is reported but other constraints are evaluated to collect data for various reasons (e.g., adapting the translation function, diagnostics, etc.). In some embodiments, the translator breaks out and reports a violation as in the example flowcharts. But the translator unit also reports the outcome to another module that continues the evaluation of the change against other constraints.

Figure 4:
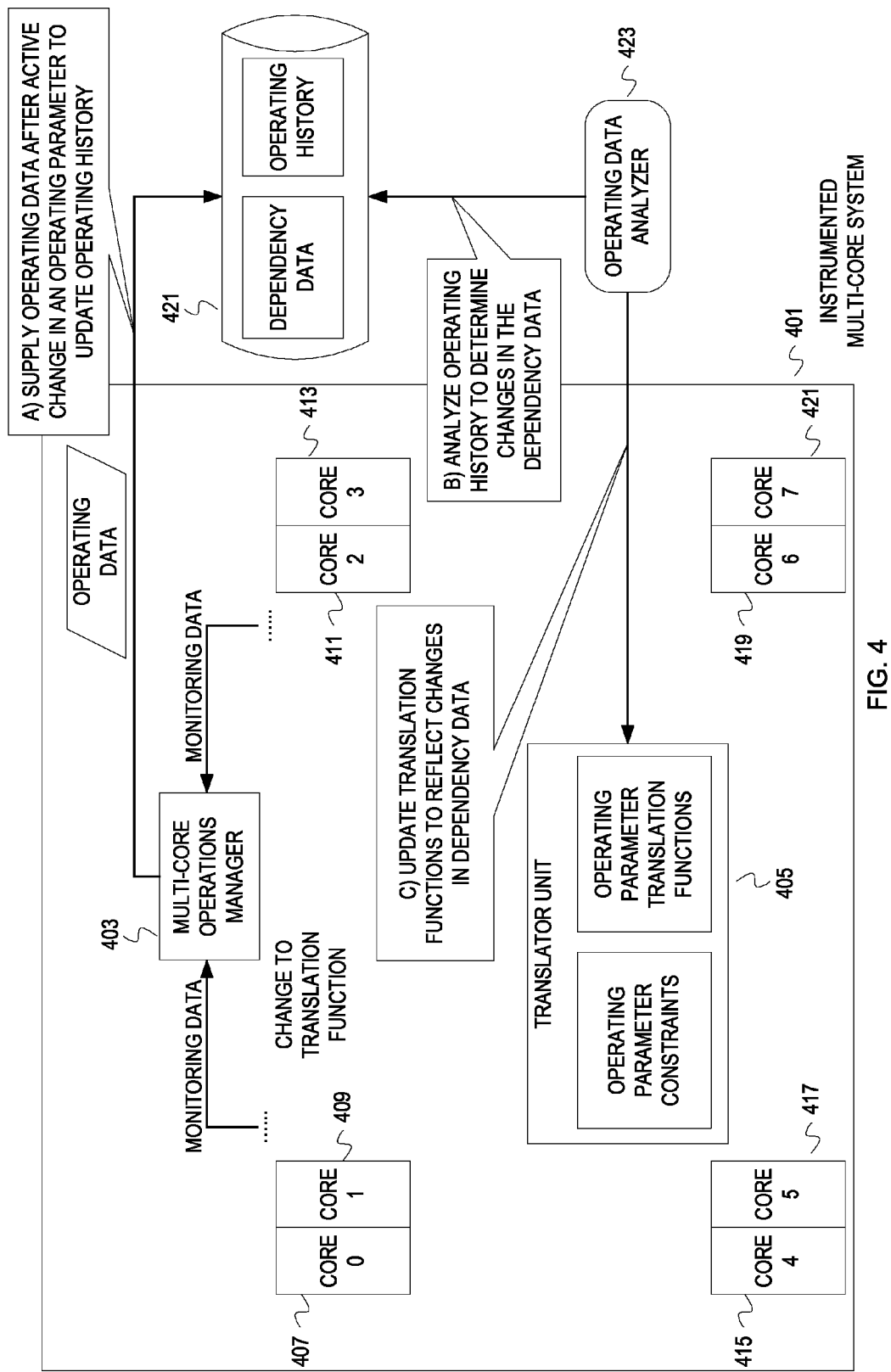
FIG. 4 depicts an example conceptual diagram of a multi-core system that adapts the translator unit with information from an operating data analyzer.

FIG. 4 depicts an example conceptual diagram of a multi-core system that adapts the translator unit with information from an operating data analyzer. An instrumented multi-core system 401 comprises a multi-core operations manager 403, 8 cores (core 0 407, core 1 409, core 2, 411, core 3 413, core 4 415, core 5 417, core 6 419, and core 7 421), and a translator unit 405. Similar to the instrumented multi-core system 101, the instrumented multi-core system 401 comprises un-depicted instrumentation that monitors operating parameters and/or events of the multi-core system 401. FIG. 4 depicts the multi-core operations manager 403 adapted to receive monitoring data from instrumentation and to send operating data to a repository 421.

The repository 421 hosts dependency data and operating history data. The dependency data reflects the direct and indirect relationships among operating parameters and cores of the multi-core system 401. The dependency data at least includes an expression of the translation functions (e.g., a description, representation, or functions themselves) encoded in the translator unit 405. The operating history data indicates changes and/or events correlated with effects of the changes and/or events in the multi-core system 401. An operating data analyzer 423 analyzes the operating history data to determine any changes in the relationships among the operating parameters and the cores. For instance, the hardware counters may reflect greater wear on cores than represented in the translation functions. The operating data analyzer 423 and the repository may be on-chip or off-chip. For example, the operating data analyzer may be an application specific integrated circuit adapted to communicate with the multi-core system 401. The operating data analyzer 423 can be computer readable program code running on any one of the cores of the multi-core system. Stages A-C depicts example operations for adapting the translation functions to changes in relationships among the operating parameters and the cores.

At a stage A, the multi-core operations manager supplies operating data after an active change in an operating parameter for update of the operating history data in the repository 421. An active change is a change in an operating parameter initiated by the multi-core operations manager 403 or any one of the cores. In some embodiments, the cores can report operating data to the repository. The operating data can be supplied as event/changes occur, supplied periodically, supplied in batches, etc.

At a stage B, the operating data analyzer 423 analyzes the operating history data to determine any changes in the dependency data. For example, the operating data analyzer 423 discovers that a change in first operating parameter at core 15 results in a greater magnitude of change in a second operating parameter at cores 16-20 than expressed in the dependency data. The operating data analyzer 423 updates the dependency data accordingly.

At a stage C, the operating data analyzer 423 updates the translation functions of the translator unit 405 to account for the discovered changes in the dependency data. The operating data analyzer 423 may not have direct access to the translator unit. In some embodiments, the operating data analyzer 423 communicates the discovered changes in dependency to another unit that modifies the translation functions and reprograms or reconfigures the translator unit accordingly.

Another aspect that can vary across embodiments is the arrangement of translation functions and/or order of evaluation. For instance, a translator unit may be implemented to initially perform the translation functions and evaluate the constraints of the causal core before advancing to the translation functions and constraints of affected cores. Analysis of an operating history of a multi-core system may reveal a tendency for constraints of affected cores to be violated more frequently than constraints of the causal core. The translator unit can then be adapted or reconfigured to evaluate those constraints with a higher frequency of violations earlier.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
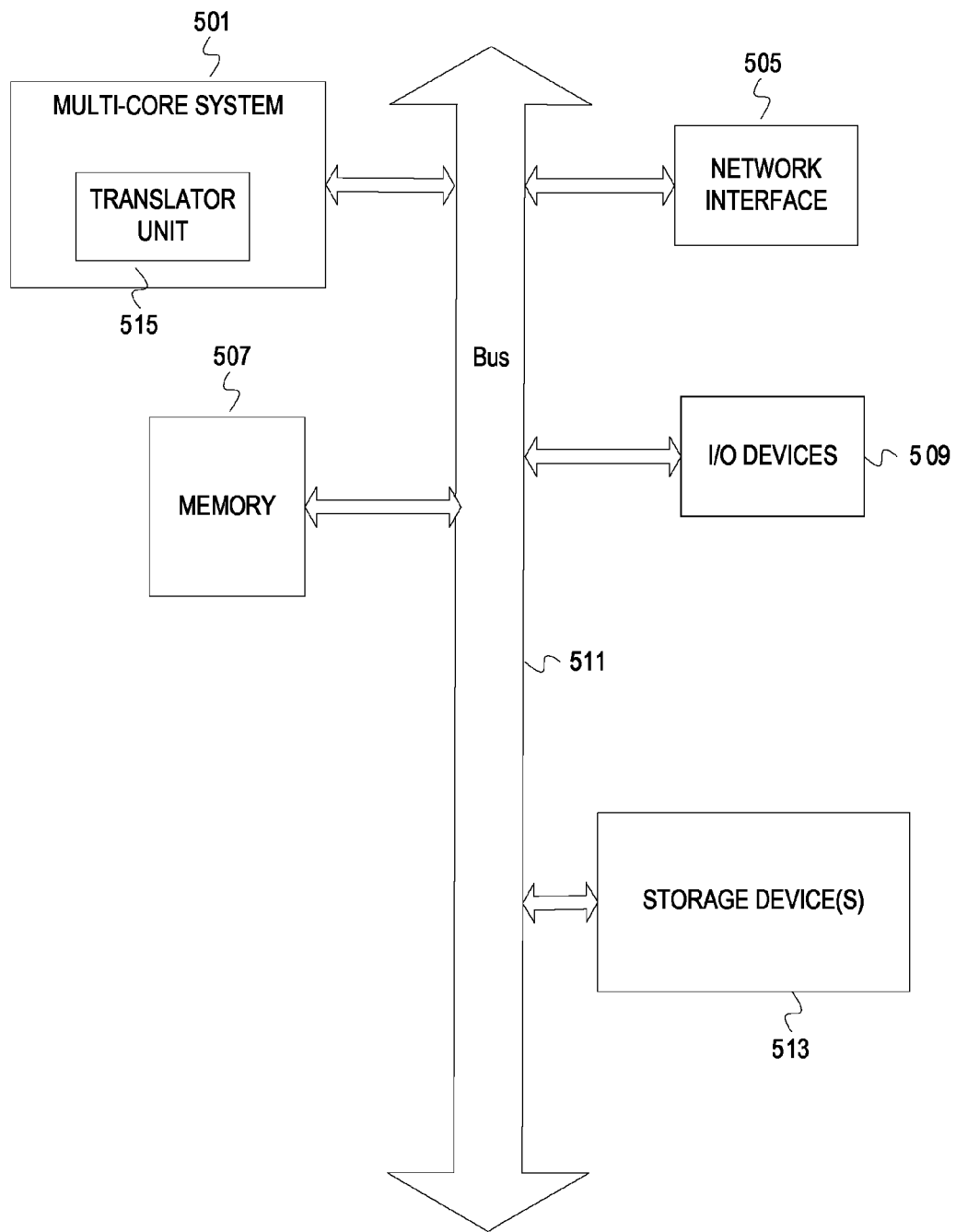
FIG. 5 depicts an example computer system with a multi-core system that comprises a translator unit.

FIG. 5 depicts an example computer system with a multi-core system that comprises a translator unit. A computer system includes a multi-core system 501 (e.g., two-dimensional processor, three-dimensional processor). The multi-core system 501 comprises a translator unit 515. The translator unit 515 translates operating parameter values among different operating parameters and/or among different cores of the multi-core system 501. The translator unit 515 also evaluates the translated operating parameter values against one or more constraints of various operating parameters of the multi-core system. The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 511 (e.g., PCI, ISA, PCI-Express, HyperTransport® bus, InfiniBand® bus, NuBus, etc.), a network interface 505 (e.g., an ATM interface, an Ethernet interface, a Frame Relay interface, SONET interface, wireless interface, etc.), I/O devices 509 (e.g., keyboard, mouse, monitor, microphone, speaker, etc.), and a storage device(s) 513 (e.g., optical storage, magnetic storage, etc.). The multi-core system 501, the storage device(s) 513, the I/O devices 509, and the network interface 505 are coupled to the bus 513. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for ascertaining and assessing the effects of a change in an operating parameter across other operating parameters and relevant components in a system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of operating a multi-core system, the method comprising:
    receiving an indication of a first value that quantifies a change in a first operating parameter corresponding to a first component of the multi-core system, wherein the change in the first operating parameter has either been detected in the multi-core system or has been requested;
    translating the first value into a second value that quantifies a change in a second operating parameter, wherein the change in the second operating parameter results from the change in the first operating parameter;
    determining whether the second value violates a constraint on the second operating parameter;
    generating an outcome based, at least in part, on said determining whether the second value violates the constraint on the second operating parameter; and
    supplying the outcome to influence initiation of an action that either reconciles the change in the first operating parameter that has been detected or effects the change in the first operating parameter at the first component.

2. The method of claim 1 further comprising determining that the first value does not violate a constraint of the first component on the first operating parameter.

3. The method of claim 1, wherein the second value represents the change in the second operating parameter at the first component.

4. The method of claim 1, wherein the second value represents the change in the second operating parameter at a second component of the multi-core system.

5. The method of claim 1 further comprising:
    translating the first value into a plurality of values, wherein each of the plurality of values represents a change in the first operating parameter at each of other ones of a plurality of components of the multi-core system, which include the first component; and
    determining whether each of the plurality of values violates corresponding ones of a plurality of constraints defined for the other ones of the plurality of components for the second operating parameter.

6. The method of claim 1, wherein the first operating parameter comprises one of temperature, voltage, current, frequency, power, throttling, multi-threading level, and workload.

7. The method of claim 1, wherein said supplying the outcome comprises a translator unit supplying the outcome to one of the first components and a microcontroller that manages operation of at least the first component in the multi-core system, wherein the translator unit comprises a state machine embodied in the multi-core system.

8. The method of claim 1 further comprising:
determining that a difference in effect of the first operating parameter on the second operating parameter is different than encoded in a translation function used for said translating the first value into the second value; and
adapting the translation function to reflect the difference.

9. The method of claim 8, wherein said determining the difference in effect is based, at least in part, on a history of operating data for the multi-core system.

10. A multi-core system comprising:
a plurality of components of the multi-core system;
instrumentation adapted to monitor the multi-core system; and
a translator unit encoded with a plurality of translation functions and a plurality of constraints, the translator unit adapted to,
receive an indication of a first value that quantifies a change in a first operating parameter corresponding to a first component of the plurality of components;
select a set of the plurality of translation functions associated with the first component and the first operating parameter;
successively select each of the set of the plurality of translation functions, translate the first value into a translated value with the selected one of the set of the plurality of translation functions, and evaluate those of the plurality of constraints that correspond to the translated value until either a constraint violation is determined or the first value has been translated with each of the set of the plurality of translation functions;
generate an outcome that indicates either the constraint violation or constrain adherence; and
supply the outcome.

11. The multi-core system of claim 10 further comprising a multi-core operations manager adapted to communicate with the translator unit and adapted to receive requests for changes to operating parameters from a plurality of cores, wherein the plurality of components comprises the plurality of cores, wherein the translation unit being adapted to supply the outcome comprises the translator unit adapted to supply the outcome to the multi-core operations manager, and the multi-core operations manager adapted to initiate an action in accordance with the outcome.

12. The multi-core system of claim 10, wherein the plurality of translation functions comprises any one of functions to translate between different ones of a plurality of operating parameters that include the first operating parameter, functions to translate between the plurality of components, and functions to translate between the different ones of the plurality of operating parameters and across the plurality of components.

13. The multi-core system of claim 10, wherein the plurality of components comprise computing components and memory components.

14. The multi-core system of claim 10, wherein the instrumentation comprises at least one of digital thermal sensors, critical path monitors, and hardware counters.

15. The multi-core system of claim 10, wherein the translator unit comprises a finite state machine.

16. A system comprising:
a plurality of components;
instrumentation adapted to monitor the system; and
a translator unit encoded with a plurality of translation functions and a plurality of constraints, the translator unit adapted to,
receive an indication of a first value that quantifies a change in a first operating parameter corresponding to a first component of the system, wherein the change in the first operating parameter has either been detected in the system or has been requested;
translate the first value into a second value that quantifies a change in a second operating parameter, wherein the change in the second operating parameter results from the change in the first operating parameter;
determine whether the second value violates a constraint on the second operating parameter;
generate an outcome based, at least in part, on a determination of whether the second value violates the constraint on the second operating parameter; and
supply the outcome to influence initiation of an action that either reconciles the change in the first operating parameter that has been detected or effects the change in the first operating parameter.

17. The system of claim 16 further comprising the translator unit adapted to determine that the first value does not violate a constraint of the first component on the first operating parameter.

18. The system of claim 16, wherein the second value represents the change in the second operating parameter at the first component.

19. The system of claim 16, wherein the second value represents the change in the second operating parameter at a second component of the plurality of components.

20. The system of claim 16, wherein the translator unit is further adapted to:
translate the first value into a plurality of values, wherein each of the plurality of values represents a change in the first operating parameter at each of other ones of the plurality of components of the system, which includes the first component; and
determine whether each of the plurality of values violates corresponding ones of a plurality of constraints defined for the other ones of the plurality of components for the second operating parameter.

* * * * *